United States Patent
Cerrano

(10) Patent No.: US 9,295,862 B2
(45) Date of Patent: Mar. 29, 2016

(54) FIRE-FIGHTING SYSTEM

(71) Applicant: Jason Cerrano, Wentzville, MO (US)

(72) Inventor: Jason Cerrano, Wentzville, MO (US)

(*) Notice: Subject to any disclaimer, the term of this patent is extended or adjusted under 35 U.S.C. 154(b) by 125 days.

(21) Appl. No.: 13/747,062

(22) Filed: Jan. 22, 2013

(65) Prior Publication Data

US 2013/0186651 A1 Jul. 25, 2013

Related U.S. Application Data

(60) Provisional application No. 61/588,452, filed on Jan. 19, 2012.

(51) Int. Cl.
*A62C 37/00* (2006.01)
*A62C 33/00* (2006.01)
*A62C 31/02* (2006.01)

(52) U.S. Cl.
CPC .................. *A62C 37/00* (2013.01); *A62C 33/00* (2013.01); *A62C 31/02* (2013.01)

(58) Field of Classification Search
CPC ........ A62C 37/00; A62C 37/50; A62C 33/00; A62C 27/00; A62C 31/02
USPC ........... 169/13, 17, 19, 24, 45–47, 52, 60, 61, 169/67, 68, 16, 18; 239/1, 69, 74, 172, 398, 239/570, 458, 455–457, 539, 72; 137/272, 137/291, 355.16–355.19, 355.2, 355.26, 137/624.11; 417/1, 13, 18, 22, 26, 32, 34, 417/43, 63, 212, 278, 279, 316–319; 251/205–209
See application file for complete search history.

(56) References Cited

U.S. PATENT DOCUMENTS

| | | | | |
|---|---|---|---|---|
| 4,189,005 A * | 2/1980 | McLoughlin | | 169/24 |
| 4,930,704 A * | 6/1990 | Chen | | 239/579 |
| 6,651,900 B1 * | 11/2003 | Yoshida | | 239/72 |
| 7,503,338 B2 * | 3/2009 | Harrington et al. | | 137/355.2 |
| 7,523,876 B2 * | 4/2009 | Wolfe | | 239/581.1 |
| 2006/0131038 A1 * | 6/2006 | Lichtig | | 169/52 |
| 2006/0180321 A1 * | 8/2006 | Yoshida | | 169/13 |
| 2008/0041599 A1 * | 2/2008 | Mulkey et al. | | 169/60 |
| 2009/0218108 A1 * | 9/2009 | Cano | | 169/24 |
| 2011/0187524 A1 * | 8/2011 | Cochran, III | | 340/539.1 |

OTHER PUBLICATIONS

Pepperl+Fuchs, "RFID Monitors Hose Connections", Application Report, Mar. 2011, <http://www.pepperl-fuchs.us/usa/downloads_USA/AR-RFID-03-2011-RFID_monitors_hose_connections.pdf>.*
International Association of Fire Chiefs, National Fire Protection Association, Fundamentals of Fire Fighter Skills, 2009, Jones and Bartlett Learning, 3rd Edition, p. 479.*

* cited by examiner

*Primary Examiner* — Len Tran
*Assistant Examiner* — Cody Lieuwen
(74) *Attorney, Agent, or Firm* — Armstrong Teasdale LLP

(57) ABSTRACT

A hose appliance is provided for use with a fire-fighting device. The hose appliance includes an inlet removably coupleable to a first hose and/or a first hose appliance, a first outlet removably coupleable to a second hose and/or a second hose appliance, a body extending between the inlet and the first outlet, and a control module including a transceiver configured to receive data from the fire-fighting device and to transmit data to the fire-fighting device to facilitate controlling the fire-fighting device.

20 Claims, 4 Drawing Sheets

FIRE-FIGHTING SYSTEM

CROSS-REFERENCE TO RELATED APPLICATIONS

This application claims the benefit of U.S. Provisional Patent application Ser. No. 61/588,452, filed Jan. 19, 2012, which is herein incorporated by reference in its entirety.

BACKGROUND

The field of the disclosure relates generally to fire-fighting systems, and more specifically, to methods and systems for use in controlling fluid flow.

Fire-fighting devices (e.g., pumper trucks) are used to fight fires by pumping fluid (e.g., water, foam, or another flame retardant) from a source through hose lines wherein the liquid may be directed, i.e., sprayed, on a fire to facilitate the extinguishing or containing the fire. Known pumper trucks include controls to regulate the operation of the truck and to control the flow of liquid from the truck into the hose lines. Such controls generally include a plurality of valves used to control the flow of liquid to a fire pump from a storage tank transported onboard the truck or from another liquid supply source (e.g., a fire hydrant). Such valves also enable control of the flow of liquid from the fire pump to fire hoses or other discharge devices. Known controls include pressure and flow rate gauges used to monitor the pressure and flow rate of liquid at various locations within the pumper truck. For example, pressure gauges may monitor the pressure of the liquid received by the fire pump from the supply source. Generally the pumper truck controls used to regulate the valves and the fire pump, as well as the pressure and flow rate gauges, are commonly positioned in a control panel on the side of the pumper truck.

In known pumper trucks, during use, an operator, typically referred to as an engineer, must manually operate the controls of the pumper truck. More specifically, the engineer manually manipulates the controls to alter the flow rate and/or to control the pressure of liquid output by the pumper truck to a hose. Moreover, during operation, a firefighter positioned near a nozzle of the hose coupled to the pumper truck verbally communicates to the engineer (typically via a hand-held radio) any desired changes in the flow rate and/or pressure of liquid delivered through the hose to the nozzle. In response, the engineer manually adjusts the controls to enable the desired change in the flow rate and/or pressure of liquid delivered through the hose to be achieved. It is common for one engineer to be responsible for monitoring and responding to communications from multiple firefighters that each have a separate hose coupled to the same pumper truck. Moreover, the same engineer may also be responsible for acting as a spotter and/or controlling the operations of a mechanized fire ladder.

Accordingly, known control systems rely on the engineer to translate and execute orders communicated by a firefighter, and in response, to manipulate the controls of the pumper truck. The reliance on the engineer increases both the cost of operations and introduces the possibility of human error, as the engineer must listen to and understand verbal commands that may be difficult to understand and/or interpret depending on the location of the firefighter, the location of the fire, and/or other factors including environmental factors.

BRIEF SUMMARY

In one aspect, a hose appliance is provided for use with a fire-fighting device. The hose appliance includes an inlet removably coupleable to a first hose and/or a first hose appliance, a first outlet removably coupleable to a second hose and/or a second hose appliance, a body extending between the inlet and the first outlet, and a control module including a transceiver configured to receive data from the fire-fighting device and to transmit data to the fire-fighting device to facilitate controlling the fire-fighting device.

In another aspect, a nozzle is provided for use with a fire-fighting device. The nozzle includes an inlet removably coupleable to a hose and/or a hose appliance, an outlet, a body extending between the inlet and the outlet, and a collar circumscribing at least a portion of the body. The collar is rotatable about the body to facilitate controlling the fire-fighting device. A control module includes a transceiver configured to receive data from the fire-fighting device and to transmit data to the fire-fighting device to facilitate controlling the fire-fighting device.

In yet another aspect, a nozzle is provided. The nozzle includes an inlet removably coupleable to a hose and/or a hose appliance, an outlet, a body extending between the inlet and the outlet, a control module including a transceiver configured to receive data from the fire-fighting device and to transmit data to the fire-fighting device to facilitate controlling the fire-fighting device, and an identifier configured to uniquely identify the nozzle.

The features, functions, and advantages may be achieved independently in various implementations of the present disclosure or may be combined in yet other implementations, further details of which may be seen with reference to the following description and drawings.

Although specific features of various implementations may be shown in some drawings and not in others, this is for convenience only. Any feature of any drawing may be referenced and/or claimed in combination with any feature of any other drawing.

DETAILED DESCRIPTION

The present disclosure relates to fire-fighting systems, and more specifically, to methods and systems for use in controlling fluid flow. In one embodiment, a hose appliance includes an inlet that is removably coupleable to a first hose and/or a first hose appliance, an outlet that is removably coupleable to a second hose and/or to a second hose appliance, a body that extends between the inlet and the outlet, and a control module that includes a transceiver that receives data from the fire-fighting device and that transmits data to the fire-fighting device to facilitate controlling the fire-fighting device.

As used herein, an element or step recited in the singular and preceded with the word "a" or "an" should be understood as not excluding plural elements or steps unless such exclusion is explicitly recited. Moreover, references to "one implementation" or "some implementations" are not intended to be interpreted as excluding the existence of additional implementations that also incorporate the recited features.

Figure 1:
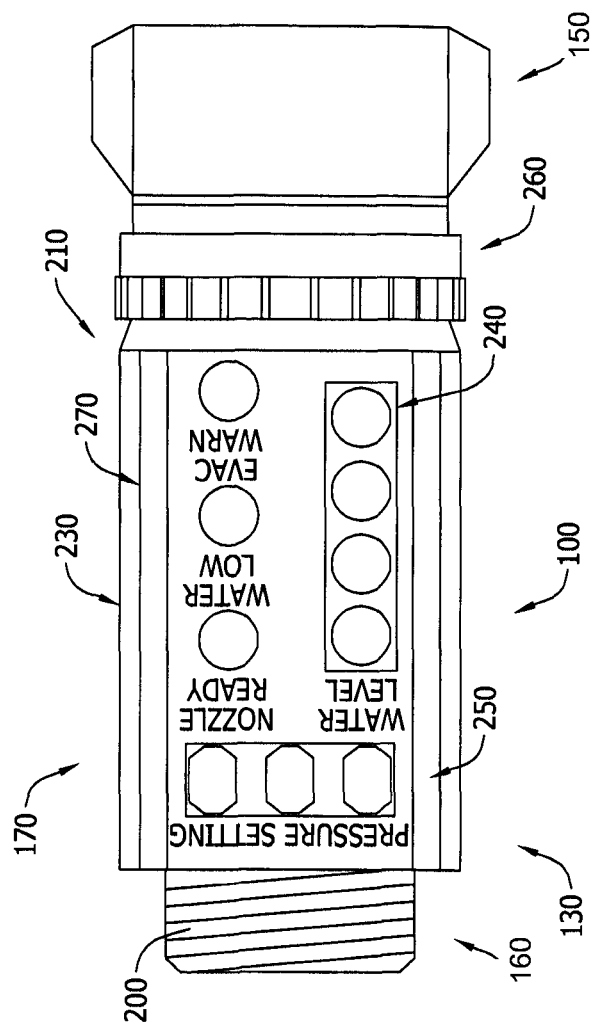
FIG. 1 is a perspective view of a first exemplary embodiment a hose appliance that may be used with a fire-fighting system.
Figure 2:
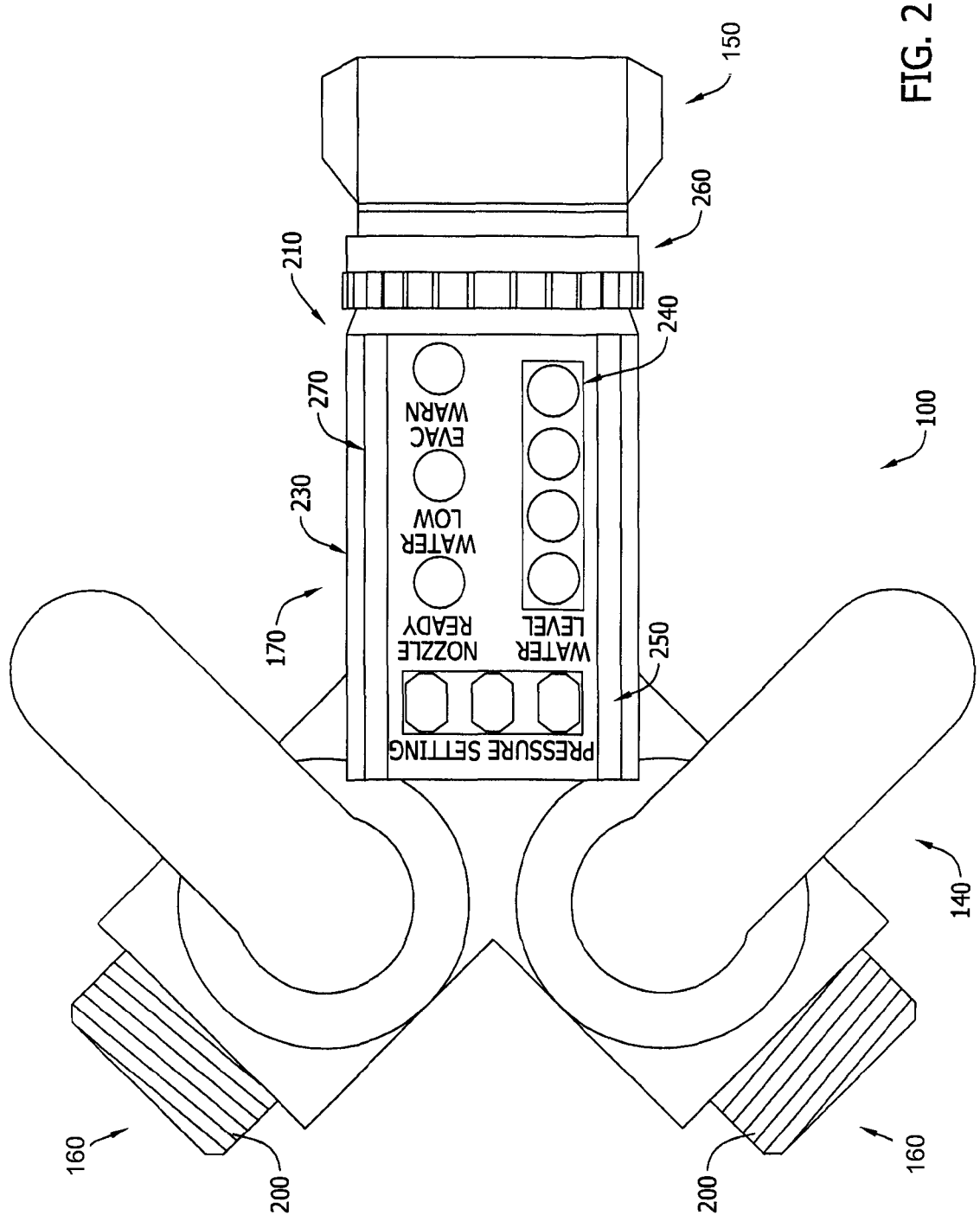
FIG. 2 is a perspective view of a second exemplary embodiment of a hose appliance that may be used with a fire-fighting system.

FIG. 1 is a perspective view of a first exemplary embodiment 130 of a hose appliance 100 that may be used with a fire-fighting device (e.g., a fire truck) at a location remote from hose appliance 100. FIG. 2 is a perspective view of a second exemplary embodiment 140 of hose appliance 100. As used herein, a hose appliance is a tool used by firefighters to direct or control fluid flow and is positioned between a fluid source (e.g., a pump and/or a hydrant) and a fluid destination (e.g., a nozzle).

In the exemplary embodiment, hose appliance 100 includes at least one inlet 150 that is removably coupleable to a hose and/or another hose appliance, at least one outlet 160 that is removably coupleable to a hose and/or another hose appliance (not shown), and a body 170 extending between inlet 150 and outlet 160. As shown in FIG. 1, hose appliance 100 is a coupling that includes one inlet 150 and one outlet 160. As shown in FIG. 2, hose appliance 100 is a gated wye that includes one inlet 150 and a plurality of outlets 160. In the exemplary embodiment, the gated wye includes at least one gate (not shown) for controlling water flow through outlets 160. The gate may be actuated automatically or manually.

Hose appliance 100 may include any number of inlets 150 and/or outlets 160 that enables hose appliance 100 to function as described herein. Inlet 150 and/or outlet 160 may also be of any size to fit any hose diameter, and/or inlet 150 and/or outlet 160 may be mismatched in size to be either a reducing coupling or an enlarging coupling. Any hose appliance mentioned as a hose appliance, a coupling, and/or a gated wye is interchangeable with any hose appliance in the fire service used to connect hose or other hose appliances on a fire scene to the fire-fighting device.

Figure 3:
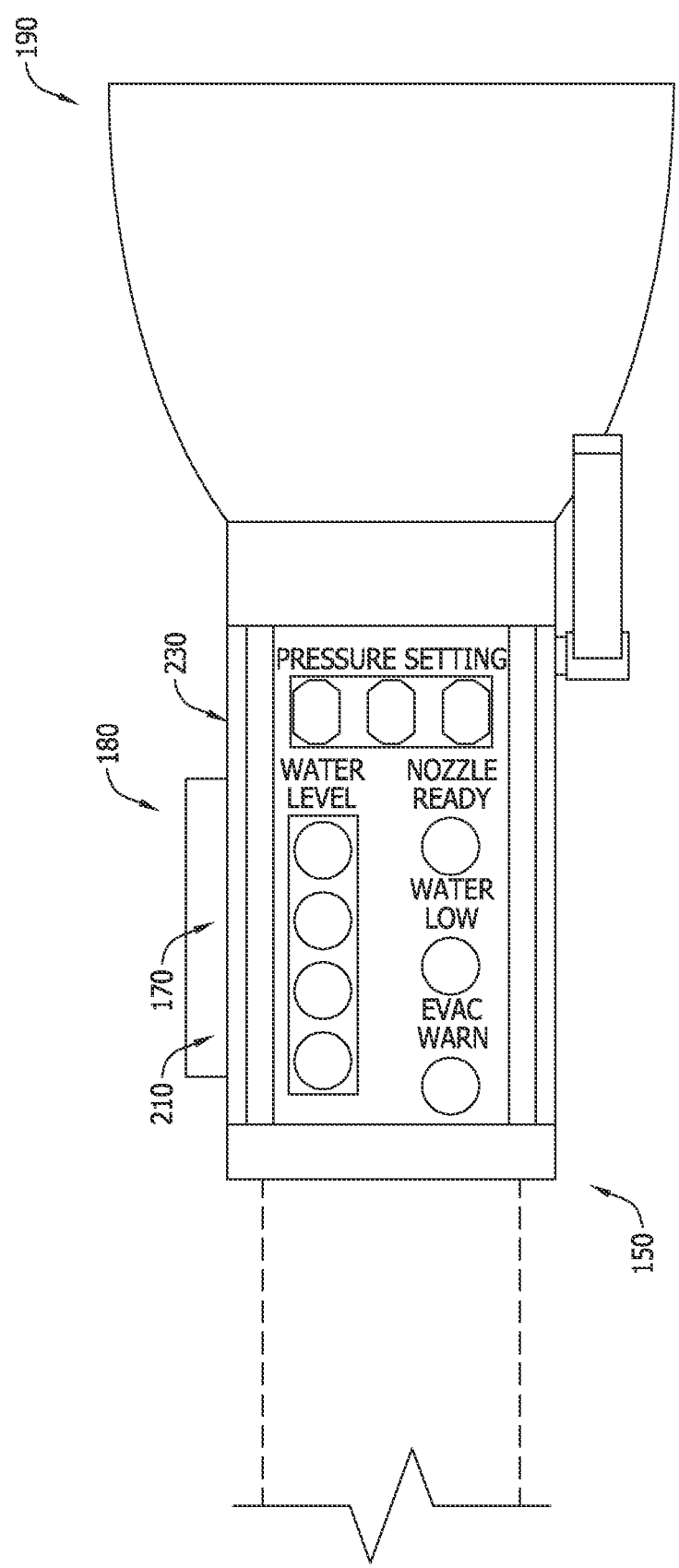
FIG. 3 is a perspective view of an exemplary nozzle that may be used with a fire-fighting system.

FIG. 3 is a perspective view of an exemplary nozzle 180 that may be used with the fire-fighting device and/or hose appliance 100. In the exemplary embodiment, nozzle 180 includes inlet 150 removably coupleable to a hose and/or hose appliance 100, an outlet 190 configured to discharge fluid, and body 170 extending between inlet 150 and outlet 190. In the exemplary embodiment, inlet 150 and/or body 170 of nozzle 180 may be substantially similar to inlet 150 and/or body 170 of hose appliance 100. In the exemplary embodiment, outlet 190 includes a mechanism that enables nozzle 180 to discharge fluid therefrom in a desired manner (e.g., a stream, a cloud, a mist). That is, outlet 190 is configured to control and/or modify a direction and/or a characteristic of fluid flow (e.g., flow rate, speed, direction, mass, shape, and/or pressure) as it is discharged from nozzle 180.

In the exemplary embodiment, inlet 150 includes a first connector (e.g., a threaded inner surface removably coupleable to a hose and/or another hose appliance having a threaded outer surface) (not shown), and outlet 160 includes a second connector (e.g., a threaded outer surface 200 removably coupleable to a hose and/or another hose appliance having a threaded inner surface). Alternatively, inlet 150 and/or outlet 160 may include any other coupling mechanism that enables inlet 150 and/or outlet 160 to be coupled to a hose and/or another hose appliance.

In the exemplary embodiment, hose appliance 100 and/or nozzle 180 includes a control module 210 operable to wirelessly communicate with the fire-fighting device. In the exemplary embodiment, control module 210 includes a transceiver (not shown) configured to receive data from the fire-fighting device and to transmit data to the fire-fighting device to facilitate controlling the fire-fighting device. For example, in the exemplary embodiment, data transmitted to the fire-fighting device facilitates opening and/or closing a valve, increasing and/or decreasing a fluid pressure, and/or increasing and/or decreasing a flow rate based on user input.

In the exemplary embodiment, a display module 230 is configured to provide information to the user. In the exemplary embodiment, display module 230 is coupled to control module 210 and includes a tank level indicator 240. In the exemplary embodiment, tank level indicator 240 includes a plurality of lights and is configured to illuminate the lights based on a fluid supply associated with hose appliance 100 and/or nozzle 180. For example, when hose appliance 100 and/or nozzle 180 is coupled to a tank (not shown), tank level indicator 240 illuminates a number of lights that correspond to a volume of fluid stored within the tank (e.g., a full tank is indicated by illuminating all of the lights, a half tank is indicated by illuminating half of the lights, and an empty tank is indicated by illuminating none of the lights). When hose appliance 100 and/or nozzle 180 is coupled to a continuous fluid supply (e.g., a hydrant) (not shown), tank level indicator 240 is a continuous fluid source indicator and illuminates the lights different from when the hose appliance 100 and/or nozzle 180 is coupled to the tank. For example, tank level indicator 240 may illuminate the lights in a different color and/or blink and/or pulse in a predetermined pattern. Alternatively, tank level indicator 240 may illuminate the lights in any pattern and/or color that enables tank level indicator 240 to function as described herein.

In the exemplary embodiment, display module 230 includes a pressure setting indicator 250 that includes a plurality of lights and configured to illuminate the lights based on an amount of fluid requested through hose appliance 100 and/or nozzle 180. For example, pressure setting indicator 250 displays numbers that correspond to a fluid pressure requested at and/or through hose appliance 100 and/or nozzle 180. In the exemplary embodiment, a collar 260 circumscribing at least a portion of body 170 is rotatable about body 170 to adjust the fluid pressure requested at and/or through hose appliance 100 and/or nozzle 180. For example, collar 260 may be rotated in a first direction (e.g., a counterclockwise direction) to request an increase in fluid pressure and/or at least partially open a valve, and in a second direction (e.g., a clockwise direction) to request a decrease in fluid pressure and/or at least partially close the valve.

In the exemplary embodiment, collar 260 is translatable along body 170 between a locked position and an unlocked position. In the locked position, collar 260 is restricted from rotating about body 170, and, in the unlocked position, collar 260 is free to rotate about body 170. In at least some embodiments, collar 260 is biased in the locked position. Hose appliance 100 and/or nozzle 180 may include any mechanism that enables a fluid pressure to be adjusted as described herein including, without limitation, a button, a dial, a slide, and the like.

In the exemplary embodiment, display module 230 includes a warning indicator 270 that includes a plurality of lights and configured to illuminate the lights based on a status of hose appliance and/or the fire-fighting device. For example, warning indicator 270 may illuminate the "EVAC WARN" light when there is an issue with the fluid supply and/or an evacuation warning has been issued, the "WATER LOW" light when there is a conflict between the fluid supply and the amount of fluid requested, and/or the "NOZZLE READY" light when hose appliance 100, nozzle 180, and/or the components and/or devices coupled to hose appliance 100 and/or nozzle 180 are ready for operation and/or use.

In at least some embodiments, hose appliance 100 and/or nozzle 180 includes at least one sensor (not shown) configured to detect whether inlet 150 and/or outlet 160 is coupled to a hose and/or another hose appliance to facilitate determining when hose appliance 100, nozzle 180, and/or the components and/or devices coupled to hose appliance 100 and/or nozzle 180 are ready for operation and/or use. For example, in one embodiment, control module 210 is incapable of sending signals, but can receive information, until inlet 150 and/or outlet 160 is coupled to a hose and/or another hose appliance.

Moreover, in the exemplary embodiment, hose appliance 100 and/or nozzle 180 includes an identifier (not shown) configured to uniquely identify hose appliance 100 and/or nozzle 180. In the exemplary embodiment, the identifier may be any suitable identifying mechanism including, without limitation, a static address, a serial number, a radio-frequency identification (RFID) tag, and/or a bar code. In the exemplary embodiment, the identifier may be embedded in hose appliance 100 and/or nozzle 180 and/or may be coupled to hose appliance 100 and/or nozzle 180 using any suitable coupling mechanism including, without limitation, a band, a collar, a staple, and the like.

In the exemplary embodiment, the sensor and/or identifier may be used to code hose appliance 100 and/or nozzle 180 to a portion of the fire-fighting device. For example, when the sensor detects the identifier and/or identifies that hose appliance 100 and/or nozzle 180 is attempting to connect to a portion of the fire-fighting device, control module 210 addresses and/or assigns hose appliance 100 and/or nozzle 180 to a discharge, logic address, router, or valve controller associated with the portion of the fire-fighting device. In the exemplary embodiment, hose appliance 100 and/or nozzle 180 remain coded to the assigned portion at least until it is disconnected from the hose line. Accordingly, in the exemplary embodiment, the sensor and/or identifier facilitates providing safety measures and may prevent a user from accidentally operating a wrong hose line, mismatching control module 210 to the discharges, and/or asking for fluid before hose appliance 100 and/or nozzle 180 is properly coupled to a hose and/or another hose appliance.

The system can be utilized in several ways. In one embodiment, a fire crew could bring up a pack containing a stand pipe box that includes hose appliance 100 and/or nozzle 180 and a repeater system. Hose appliance 100 and/or nozzle 180 may be coded to the stand pipe box and/or to a discharge at the fire-fighting device. Once connected, the portable stand-pipe box serves as a repeater capable of transmitting a powerful signal. For example, hose appliance 100 and/or nozzle 180 may send/receive information from the stand pipe box, and/or the stand pipe box can act as a repeater for hose appliance 100 and/or nozzle 180 and boost the signal to the fire truck. The stand pipe system can send a signal (e.g., opening and/or closing a valve, increasing and/or decreasing a fluid pressure, and/or increasing and/or decreasing a flow rate) to a logic controller on the fire truck. The stand-pipe box can be set to a floor or crew to send water usage information back to the truck or control module 210. It can also be used to activate nozzle location beacons, evacuation warnings, water tank levels, hydrant capacity and so forth.

In another embodiment the same system could be hardwired in the building and have repeaters located throughout the building. The attack crew could take a standard stand-pipe kit with hose appliance 100 and/or nozzle 180. Hose appliance 100 and/or nozzle 180 may be coded to a stand pipe box that is pre-installed on every floor. This system could then have its own control module 210 which would communicate through repeater boxes on the outside of the building. These repeater boxes could be located anywhere on the exterior of the building. The system could also just serve as a repeater system for hose appliance 100 and/or nozzle 180, and hose appliance 100 and/or nozzle 180 may be coded directly to a valve control system on the truck or a logic system on the truck to control the flow of water to the stand-pipe of the building. In this same system the floors may be coded, or hose appliance 100 and/or nozzle 180 may have floor selections to indicate the crew's position in the building and send the same information to command or the truck operator.

Another way for control of the truck can be achieved by mounting the firefighter control directly to the gated wye. A firefighter could demand water or control the valve on the truck and then manually open and close the valves on the wye as he wishes. This system could then utilize standard nozzles. The gated wye control version would allow for use on stand pipe systems, or hose lays on the ground. The wye would simply have to be coded to that discharge in any fashion. This would also work for ground monitors, long hose lays into larger structures requiring custom hose lays, multiple hand lines controlled from a single discharge at a distant point. In this embodiment, the same control enabled gated wye could act as the repeater for a control enabled nozzle as well and boost the signal to the truck.

In the exemplary embodiment, control module 210 may be configured to account for the tools and equipment on a fire truck. For example, control module 210 may be coupled to a plurality of sensors (not shown) that, when a compartment door is opened or closed, automatically scan and compare identifiers to a previous scan. If there is a variance in the current scan and the previous scan on a per compartment basis, control module 210 notifies the user of the variance. For example, the system may identify that a hose appliance 100 and/or nozzle 180 is missing. In the exemplary embodiment, the sensors may be located near or on a discharge at the fire-fighting device, near a discharge valve controller, or any other convenient place on the fire-fighting device and/or be appropriately labeled. In one embodiment, each sensor is configured to uniquely identify a respective part or portion of the fire-fighting device (e.g., a discharge) and is communicatively coupled to a computer readable form of memory by any suitable communication system.

Moreover, in the exemplary embodiment, control module 210 may be configured to easily customize the vehicle. The fire-fighting device could be stocked and then asked to scan. This state could be set for the standard of the vehicle and this would be the standard for a daily check. This daily check could then be printed or uploaded. This check would provide a more accurate and standardized method of reporting for daily check procedures. These daily check procedures are important for protecting a fire department from liability issues should a problem arise on scene due to lack of equipment. This same system by scanning the compartment automatically when a door is opened and then comparing it again to when the door is closed will help keep tools from being lost or left on scene. This same system can be activated by the truck being put in park and then drive, being placed in or out of pump operations, or any other change in state of the operation of the vehicle which would mark a point in time which the vehicle may have had tools taken off of the truck. The cost of fire rescue equipment is very high. Any system that would keep tools from being lost at scene would have great value to the fire service. This same benefit is important when a truck may be called from one scene to the next. A vehicle may be operating on scene and then have to leave to the next. If the vehicle leaves without a tool and this tool is needed for the next scene the firefighters could be at a serious disadvantage. This same system could also be implemented for an ambulance, heavy rescue truck, or any other truck containing tools and equipment for the rescue field.

Equipment that requires fuel, oil, or any type of material to be at a state of operational readiness can have a mount or holder made to be placed in the truck. This mount or holder can have a scale or sensor placed on, in, or around the device to determine an empty state, less than full state, or full state. This information would then be sent to the same system as described above for accountability of not only that tool but its state of readiness. This type of mounting device would work some of but not limited to the following examples: ventilation fans, chain saws, extrication pumps, circular saws, EMS bags, EMS monitors, EMS monitor bags. Equipment requiring any liquid for lubrication or fuel could also have an internal level sensor which would also communicate with the accountability system by either connection or wirelessly. Battery level checks of anything operated electrically can also be relayed to the system. Items such as flashlights, EMS monitors, suction equipment, laryngoscope handles, radios, thermal imagers, and other devices requiring batteries can also be fitted or modified to work with this system. The charging mechanisms can relay this information or be done by the items themselves.

This system can be modified by the users on a regular basis. Tools could either have a set identifier for the type of tool or the tool could have a number set to it by the department. The tools could be tagged by department, by truck, by tool, or by compartment. It could also include any combination of the previous information. This identifier would then respond to a master system which could also be programmed with the same appropriate information that would best fit the user's needs. This system would then report any changes, discrepancies, or omissions when appropriate or as described above.

This system would be comprised of one or more scanners as needed per the vehicle and its compartment configuration and equipment load. The scanners would be set to scan the areas and report to a central controller on the truck which can report or notify any information required at the time. This system is automatic based on the parameters of the user or a preset parameter established by the manufacturer of the vehicle or the accountability system. The system could also be comprised of tools with some type of identifier to work with the system. This identifier would be manufactured into the equipment or placed externally by the users or manufactures. The system could be wired into the vehicles transmission, compartment door sensors, lights, or pump control system to detect a state in which the system would be required to scan. This allows the functions to be performed without intervention from an operator. The system could also have a display or indicator of some type to notify the users of missing equipment or a piece of equipment that is not in a state of readiness as described above. Sensors, scales, proximity switches and any other device can be located in a mount for a specific piece of equipment and can be wired (or wireless) to send information as that that tools accountability or state of readiness. This system is not limited to fire trucks but has equal use in any apparatus operating in an emergency environment. It could be used on vehicles such as but no limited to tow trucks, police cars, ambulances, heavy rescues, rescue boats. Emergency trailers such as hazardous materials, heavy rescue, trench rescue, decontamination, and many other types of trailers made to carry a large amount of tools to an emergency could also use this technology.

Figure 4:
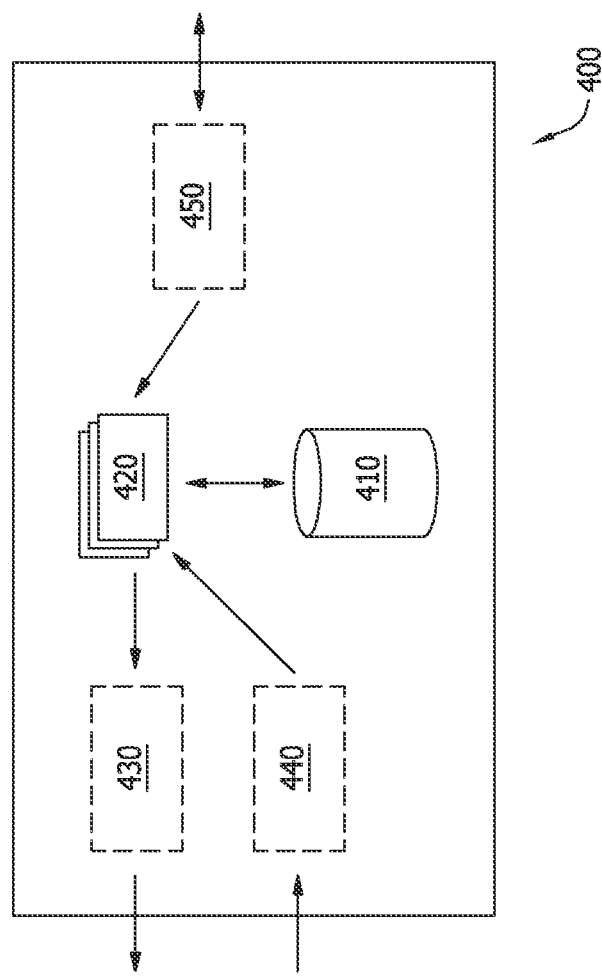
FIG. 4 is a schematic illustration of an exemplary computing system that may be used with the hose appliance shown in FIG. 1, the hose appliance shown in FIG. 2, and/or with the nozzle shown in FIG. 3.

FIG. 4 is a schematic illustration of an exemplary computing system 400 that may be used with hose appliance 100 and/or nozzle 180. For example, control module 210 may include computing system 400. In some implementations, computing system 400 includes a memory device 410 and a processor 420 coupled to memory device 410 for use in executing instructions. More specifically, in at least some implementations, computing system 400 is configurable to perform one or more operations described herein by programming memory device 410 and/or processor 420. For example, processor 420 may be programmed by encoding an operation as one or more executable instructions and by providing the executable instructions in memory device 410.

Processor 420 may include one or more processing units (e.g., in a multi-core configuration). As used herein, the term "processor" is not limited to integrated circuits referred to in the art as a computer, but rather broadly refers to a controller, a microcontroller, a microcomputer, a programmable logic controller (PLC), an application specific integrated circuit, and other programmable circuits.

In some implementations, memory device 410 includes one or more devices (not shown) that enable information such as executable instructions and/or other data to be selectively stored and retrieved. In some implementations, such data may include, but is not limited to, positional data, directional data, GPS data, map data, sensor data, operational data, and/or control algorithms. Alternatively, computing system 400 may be configured to use any algorithm and/or method that enable the methods and systems to function as described herein. Memory device 410 may also include one or more computer readable media, such as, without limitation, dynamic random access memory (DRAM), static random access memory (SRAM), a solid state disk, and/or a hard disk.

In some implementations, computing system 400 includes a presentation interface 430 that is coupled to processor 420 for use in presenting information to a user. For example, presentation interface 430 may include a display adapter (not shown) that may couple to a display device (not shown), such as, without limitation, a cathode ray tube (CRT), a liquid crystal display (LCD), a light-emitting diode (LED) display, an organic LED (OLED) display, an "electronic ink" display, and/or a printer. In at least some implementations, presentation interface 430 includes one or more display devices.

Computing system 400, in some implementations, includes an input interface 440 for receiving input from the user. For example, in at least some implementations, input interface 440 receives information suitable for use with the methods described herein. Input interface 440 is coupled to processor 420 and may include, for example, a joystick, a keyboard, a pointing device, a mouse, a stylus, a touch sensitive panel (e.g., a touch pad or a touch screen), and/or a position detector. It should be noted that a single component, for example, a touch screen, may function as both presentation interface 430 and as input interface 440.

In some implementations, computing system 400 includes a communication interface 450 that is coupled to processor 420. For example, communication interface 450 may use, without limitation, a wired network adapter, a wireless network adapter, and/or a mobile telecommunications adapter. A network (not shown) used to couple computing system 400 to the remote device may include, without limitation, the Internet, a local area network (LAN), a wide area network (WAN), a wireless LAN (WLAN), a mesh network, and/or a virtual private network (VPN) or other suitable communication means.

Some implementations of methods and systems for firefighting systems are described above in detail. The methods and systems are not limited to the specific implementations described herein, but rather, components of systems and/or steps of the method may be utilized independently and separately from other components and/or steps described herein. Each method step and each component may also be used in combination with other method steps and/or components. Although specific features of various implementations may be shown in some drawings and not in others, this is for convenience only. Any feature of a drawing may be referenced and/or claimed in combination with any feature of any other drawing.

This written description uses examples to disclose the various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A hose appliance for use with a fire-fighting device, said hose appliance comprising:
   an inlet removably coupleable to at least one of a first hose and a first hose appliance;
   a first outlet removably coupleable to at least one of a second hose and a second hose appliance;
   a body extending between the inlet and the first outlet;
   a control module positioned remote from the fire-fighting device and comprising a transceiver configured to receive data from the fire-fighting device, said control module configured to determine whether the hose appliance is coupled to a continuous fluid source based on data received from the fire-fighting device; and
   a display module mounted to said body and configured to selectively present a continuous fluid source indicator and a tank level indicator in response to the hose appliance being coupled to a continuous fluid source, wherein the display module is configured to:
      present only one of the continuous fluid source indicator and the tank level indicator when the hose appliance is coupled to the continuous fluid source, and present only the other of the continuous fluid source indicator and the tank level indicator when the hose appliance is not coupled to the continuous fluid source,
      present the continuous fluid source indicator when the hose appliance is coupled to the continuous fluid source, and
      present the tank level indicator when the hose appliance is not coupled to the continuous fluid source, wherein the tank level indicator indicates an amount fluid stored within a tank coupled to the hose appliance.

2. A hose appliance in accordance with claim 1 further comprising a second outlet coupleable to at least one of the second hose and the second hose appliance.

3. A hose appliance in accordance with claim 1 further comprising a sensor configured to detect whether at least one of the first hose is coupled to the inlet, the first hose appliance is coupled to the inlet, the second hose is coupled to the first outlet, and the second hose appliance is coupled to the first outlet.

4. A hose appliance in accordance with claim 1 further comprising an identifier configured to uniquely identify the hose appliance.

5. A hose appliance in accordance with claim 1, wherein the control module is configured to transmit data to the fire-fighting device to facilitate at least one of opening a valve, closing the valve, increasing a fluid pressure, decreasing the fluid pressure, increasing a flow rate, and decreasing flow rate based on user input.

6. A hose appliance in accordance with claim 1 further comprising a collar circumscribing at least a portion of the body, the collar rotatable about the body in a first direction and in a second direction opposite the first direction, whereby rotating the collar in the first direction results in at least one of a request for an increase in fluid pressure and/or a valve at least partially opening, and wherein rotating the collar in the second direction results in at least one of a request for a decrease in fluid pressure and/or the valve at least partially closing.

7. A hose appliance in accordance with claim 6, wherein the collar is translatable along the body in a first direction towards a locked position and in a second direction towards an unlocked position.

8. A nozzle for use with a fire-fighting device, said nozzle comprising:
   an inlet removably coupleable to at least one of a hose and a hose appliance;
   an outlet configured to discharge a fluid from the nozzle;
   a body extending between the inlet and the outlet;
   a collar circumscribing at least a portion of the body, the collar rotatable about the body in a first direction and in a second direction opposite the first direction, whereby rotating the collar in the first direction results in at least one of a request for an increase in fluid pressure and/or a valve at least partially opening, and wherein rotating the collar in the second direction results in at least one of a request for a decrease in fluid pressure and/or the valve at least partially closing, the collar translatable along the body in a first direction towards a locked position in which the collar is restricted from rotating about the body, and in a second direction towards an unlocked position in which the collar is free to rotate about the body; and
   a control module comprising a transceiver configured to receive data from the fire-fighting device and to transmit data to the fire-fighting device to facilitate controlling the fire-fighting device.

9. A nozzle in accordance with claim 8 further comprising a sensor configured to detect whether at least one of the hose and the hose appliance is coupled to the inlet.

10. A nozzle in accordance with claim 8 further comprising an identifier configured to uniquely identify the nozzle.

11. A nozzle in accordance with claim 8, wherein the control module is configured to transmit data to the fire-fighting device to facilitate at least one of opening the valve, closing the valve, increasing the fluid pressure, decreasing the fluid pressure, increasing a flow rate, and decreasing flow rate based on user input.

12. A nozzle in accordance with claim 8 further comprising a display module configured to present a tank level indicator when the hose appliance is not coupled to a continuous fluid source, and present a continuous fluid source indicator when the hose appliance is coupled to the continuous fluid source.

13. A nozzle for use with a fire-fighting device, said nozzle comprising:
   an inlet removably coupleable to at least one of a hose and a hose appliance;
   an outlet;
   a body extending between the inlet and the outlet;
   a control module positioned remote from the fire-fighting device and comprising a transceiver configured to receive data from the fire-fighting device, said control module configured to determine whether the at least one hose and hose appliance is coupled to a continuous fluid source based on data received from the fire-fighting device;

a display module mounted to said body and configured to selectively present a continuous fluid source indicator and a tank level indicator in response to the at least one hose and hose appliance being coupled to a continuous fluid source, wherein the display module is configured to:

present only one of the continuous fluid source indicator and the tank level indicator when the at least one hose and hose appliance is coupled to the continuous fluid source, and present only the other of the continuous fluid source indicator and the tank level indicator when the at least one hose and hose appliance is not coupled to the continuous fluid source, present the continuous fluid source indicator when the at least one hose and hose appliance is coupled to the continuous fluid source, and present the tank level indicator when the at least one hose and hose appliance is not coupled to the continuous fluid source, wherein the tank level indicator indicates an amount fluid stored within a tank coupled to the nozzle; and an identifier configured to uniquely identify the nozzle.

14. A nozzle in accordance with claim 13 further comprising a sensor configured to detect whether at least one of the hose and the hose appliance is coupled to the inlet.

15. A nozzle in accordance with claim 13, wherein the control module is configured to transmit data to the fire-fighting device to facilitate at least one of opening a valve, closing the valve, increasing a fluid pressure, decreasing the fluid pressure, increasing a flow rate, and decreasing flow rate based on user input.

16. A nozzle in accordance with claim 13 further comprising a collar circumscribing at least a portion of the body, the collar rotatable about the body in a first direction and in a second direction opposite the first direction, whereby rotating the collar in the first direction results in at least one of a request for an increase in fluid pressure and/or a valve at least partially opening, and wherein rotating the collar in the second direction results in at least one of a request for a decrease in fluid pressure and/or the valve at least partially closing.

17. A nozzle in accordance with claim 16, wherein the collar is translatable along the body in a first direction towards a locked position and in a second direction towards an unlocked position.

18. A hose appliance in accordance with claim 1, wherein the control module is mounted to said body of said hose appliance.

19. A hose appliance in accordance with claim 1, wherein the fire-fighting device is a fire truck.

20. A hose appliance in accordance with claim 1, wherein the display module is configured to present the tank level indicator regardless of the amount of fluid within the tank.

* * * * *